United States Patent [19]
Furukawa et al.

[11] Patent Number: 5,806,325
[45] Date of Patent: Sep. 15, 1998

[54] ABSORPTION TYPE REFRIGERATOR

[75] Inventors: Masahiro Furukawa, Gunma-ken; Shiguma Yamazaki, Ohta, both of Japan

[73] Assignee: Sanyo Electric Co., Ltd., Osaka-fu, Japan

[21] Appl. No.: 831,505

[22] Filed: Mar. 31, 1997

[30] Foreign Application Priority Data

Apr. 2, 1996 [JP] Japan .................................. 8-079929

[51] Int. Cl.$^6$ ...................................................... F25B 15/00
[52] U.S. Cl. ................................................. 62/103; 62/476
[58] Field of Search ............................. 62/103, 101, 105, 62/476, 488

[56] References Cited

U.S. PATENT DOCUMENTS 2,518,180  8/1950  Reid ........................................... 62/103
3,019,613  2/1962  Leonard ...................................... 62/103

FOREIGN PATENT DOCUMENTS 62-91761  4/1987  Japan .

Primary Examiner—William Doerrler
Attorney, Agent, or Firm—Weingarten, Schurgin, Gagnebin & Hayes LLP

[57] ABSTRACT

An absorption type refrigerator capable of reducing the concentration of an absorption solution at the time of a partial load in which a refrigerant solution storage portion 31 and a refrigerant solution discharge portion 33 partitioned by a dam 34 are provided below a heat exchanger 7 in a condenser 3 and a slit 35 is formed in the dam 34 in a vertical direction so that, at the time of a partial load or when the temperature of cold water drops at the time of a partial load, a refrigerant solution in the refrigerant solution storage portion 31 is caused to flow out from the condenser 3 through the slit 35 in the dam 34 to reduce the concentration of the absorption solution.

3 Claims, 2 Drawing Sheets

ABSORPTION TYPE REFRIGERATOR

BACKGROUND OF THE INVENTION

1. Field of the Invention

This invention relates to an absorption type refrigerator and, particularly, to an absorption type refrigerator in which a dam is provided in a refrigerant solution reservoir in a condenser.

2. Background Art

Laid-open Japanese Patent Application No. Sho 62-91761, for example, discloses an absorption type water cooler/heater in which a dam for allowing a refrigerant solution to flow thereover is provided in a condenser so that the refrigerant solution flows over the dam from the condenser to an evaporator through a refrigerant solution pipe during a cooling operation.

Methods for collecting the refrigerant solution include one in which a dam is provided in a condenser as described above and one in which a refrigerant tank is provided to collect the refrigerant solution by the operation of a refrigerant pump. In the latter method, when the absorption type refrigerator is in operation, the refrigerant pump is operated and the refrigerant solution is always collected in the refrigerant tank. When the absorption type refrigerator stops operation, the operation of the refrigerant pump is stopped and the refrigerant solution collected in the tank is caused to flow out to reduce the concentration of an absorption solution in an absorption solution circuit.

In the above absorption water cooler/heater, even when the amount of refrigerant vapor generated in a regenerator is small and the amount of the refrigerant solution flown into or condensed in the condenser is small, for example, at the time of a partial load, the amount of the refrigerant solution collected in the condenser by the dam in the condenser does not change. Therefore, even when the above apparatus must be operated at a low concentration, for example, at the time of a partial load, the concentration of the absorption solution does not decrease and operation becomes impossible.

In addition, in the above constructed absorption type refrigerator comprising said refrigerant tank, during the operation of the absorption type refrigerator the refrigerant solution is always collected in the refrigerant tank. Therefore, even when the above apparatus must be operated at a low concentration, for example, at the time of a partial load, the concentration of the absorption solution does not decrease and operation becomes impossible.

SUMMARY OF THE INVENTION

It is an object of the present invention to make possible operation at a low concentration at the time of a partial load or when the temperature of cooling water lowers at the time of a partial load to expand the operation possible range.

To solve the above problems, the present invention provides an absorption type refrigerator comprising a refrigerant cycle by connecting an absorber, regenerator, condenser and evaporator by pipes, wherein a heat exchanger for condensing refrigerant vapor in the condenser is provided in the condenser, a refrigerant solution storage portion and a refrigerant solution discharge portion partitioned by a dam are provided below the heat exchanger, and an opening communicating with the refrigerant solution storage portion and the refrigerant solution discharge portion (a slit extending in a vertical direction and a plurality of openings formed discontinuously in a vertical direction) is formed in the dam. At the time of a partial load or when the temperature of cooling water drops at the time of a partial load, the refrigerant solution gathering in the refrigerant solution storage portion is caused to flow out from the condenser through the opening formed in the dam, whereby the concentration of the absorption solution can be reduced and thereby the operation possible range is expanded. Particularly when a plurality of openings are formed discontinuously in a vertical direction, the amount of the refrigerant solution flowing out from the refrigerant solution storage portion through the openings decreases stepwise along with a reduction in the solution level of the refrigerant solution storage portion. Therefore, a sudden change in the circulation amount of the refrigerant solution along with a reduction in load is prevented.

These and other objects and advantages of the present invention will become clear by the following description of preferred embodiments of the present invention with reference to the accompanying drawings.

DETAILED DESCRIPTION OF THE PREFERRED EMBODIMENTS

A first embodiment of the present invention claimed is described in detail hereinunder with reference to the accompanying drawings.

Figure 1:
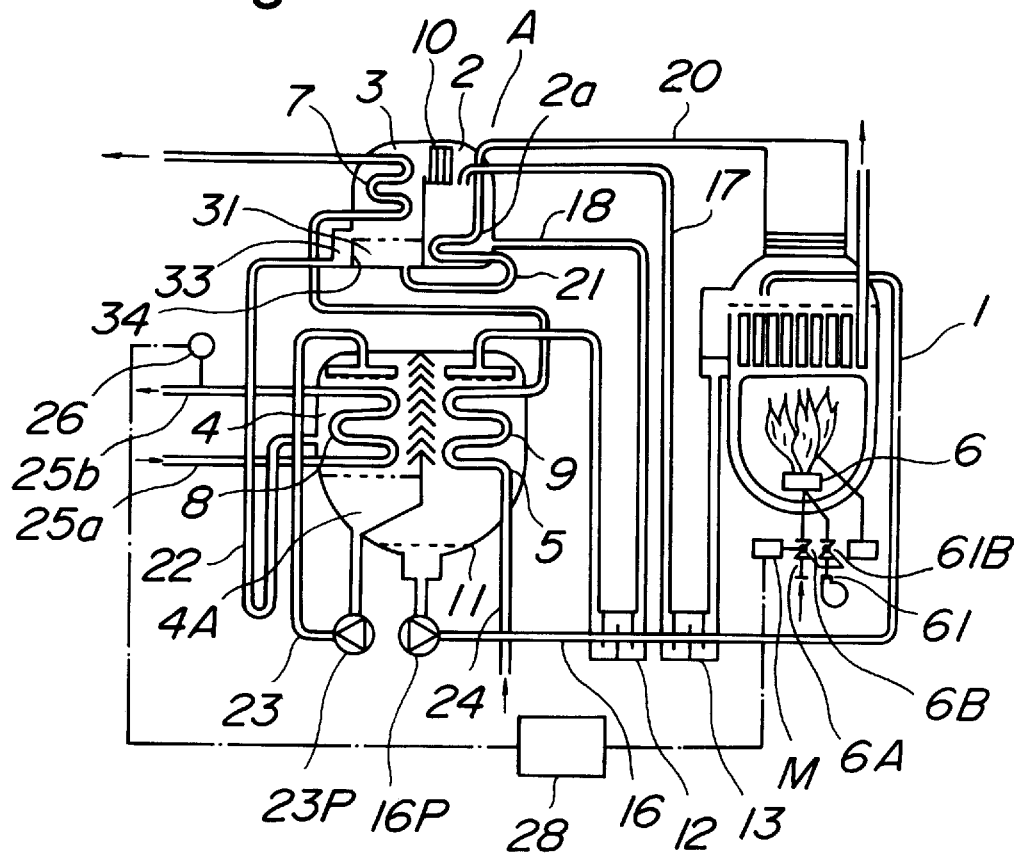
FIG. 1 is a structural diagram of an absorption type refrigerator according to the present invention.
Figure 2:
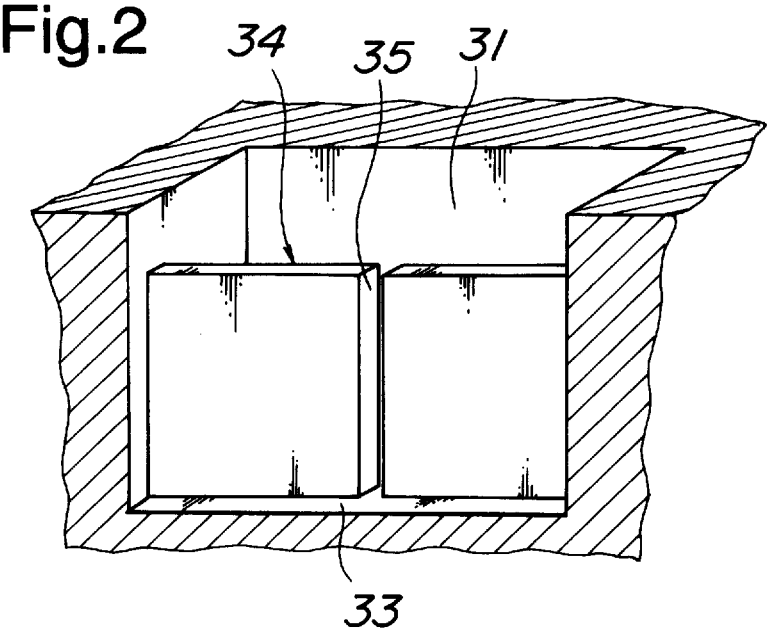
FIG. 2 is a perspective view of a dam according to a first embodiment.

FIG. 1 is a structural diagram of an absorption type refrigerator and FIG. 2 is a perspective view of a dam provided in a condenser.

Letter A in FIG. 1 denotes a double-effect absorption type refrigerator which uses water ($H_2O$) as a refrigerant and a lithium bromide (LiBr) solution as an absorption solution, for example.

In FIG. 1, reference numeral 1 denotes a high-temperature regenerator, 2 a low-temperature regenerator, 3 a condenser, 4, an evaporator, 5 an absorber, 6 a heater such as a burner provided in the high-temperature regenerator 1, to which a gas, for example, is supplied as a heat source, 7 a heat exchanger, provided in the condenser 3, for condensing a refrigerant in the condenser 3, 8 a heat exchanger, provided in the evaporator 4, for evaporating the refrigerant in the evaporator 4, 9 a heat exchanger, provided in the absorber 5, for absorbing the refrigerant in the absorber 5, 11 a lower barrel for housing the evaporator 4 and the absorber 5, 12 a low-temperature heat exchanger and 13 a high-temperature heat exchanger. A refrigerant solution reservoir 4A is formed in a lower portion of the lower barrel 11, that is, a lower portion of the evaporator 4. A refrigerant solution storage portion 31 located right below the heat exchanger 7 and a refrigerant solution discharge portion 33 protruding sideways are arranged below the heat exchanger 7 in the upper barrel 10 and partitioned by a dam 34. An opening 35 such as a slit having almost the same width as that of the dam 34 is formed from an upper end to a lower end of the dam 34 in a vertical direction as shown in FIG. 2.

The opening 35 is formed to a size that the amount of the refrigerant flowing out into the refrigerant solution discharge portion 33 becomes larger than the amount of the refrigerant flowing into the condenser 3 when an absorption type refrigerator A to be described later is operated with a partial load.

Denoted by 6A is a fuel supply pipe, connected to the heater 6, for supply fuel such as gas to the heater 6 and 6B a control valve provided along the fuel supply pipe 6A. 61 denotes a combustion air supply pipe connected to the heater 6, 61B a control valve, provided along the supply pipe 61, whose opening is controlled together with the control valve 6B, and M a motor for driving the control valve 6B and the control valve 61B.

Numeral 16 represents a diluted absorption solution pipe extending from the absorber 5 to the high-temperature regenerator 1 and having an absorption solution pump 16P, the low-temperature heat exchanger 12 and the high-temperature heat exchanger 13, 17 an intermediate absorption solution pipe extending from the high-temperature regenerator 1 to the low-temperature regenerator 2 and having the high-temperature heat exchanger 13, and 18 a concentrated absorption solution pipe extending from the low-temperature regenerator 2 to the absorber 5 and having the low-temperature heat exchanger 12.

Numeral 20 denotes a refrigerant vapor pipe extending from the high-temperature regenerator 1 to a radiator 2a of the low-temperature regenerator 2, 21 a refrigerant pipe extending from the radiator 2a to the refrigerant solution storage portion 31 of the condenser 3, 22 a refrigerant down-flow pipe extending from the refrigerant solution discharge portion 33 to the evaporator 4, one end of which is connected to a lower portion of the refrigerant solution discharge portion 33 of the condenser 3 and the other end of which is connected to the evaporator 4 of the lower barrel 11, and 23 a refrigerant circulation pipe connecting to the evaporator 4 and having a refrigerant pump 23P.

Numeral 24 denotes a cooling water pipe having the heat exchanger 9 and the heat exchanger 7. 25a and 25b denote cold water pipes having the heat exchanger 8.

Numeral 26 is a temperature detector, provided on the cold water pipe 25b at the outlet of the evaporator 4, for detecting the temperature of cold water to be supplied to an indoor heat exchanger (not shown) of a building or the like. Denoted by 28 is a controller constructed with a microcomputer or the like which is provided in a control board (not shown) of the absorption type refrigerator A and outputs a drive signal to the motor M based on the output temperature of cold water detected by the temperature detector 26.

During the operation of the absorption type refrigerator A constituted above, fuel is supplied to the heater 6 of the high-temperature regenerator 1 which then burns the fuel to start the operation of the high-temperature regenerator 1, like a conventional absorption type refrigerator. The absorption solution having a low concentration (to be referred to as "diluted absorption solution" hereinafter) is heated in the high-temperature regenerator 1 so that the refrigerant evaporates and separates from the diluted absorption solution. The evaporated refrigerant vapor flows into the low-temperature regenerator 2 through the refrigerant vapor pipe 20. An intermediate absorption solution in the low-temperature regenerator 2 is heated by the refrigerant vapor from the high-temperature regenerator 1 so that the refrigerant further separates from the intermediate absorption solution. The refrigerant vapor from the high-temperature regenerator 1 condenses in the low-temperature regenerator 2, flows into the condenser 3 and gathers in the refrigerant solution storage portion 31. The refrigerant vapor separated in the low-temperature regenerator 2 flows into the condenser 3, condenses and liquefies through heat exchanges with cooling water flowing through the heat exchanger 7, and drops into the refrigerant solution storage portion 31.

The refrigerant solution in the refrigerant solution storage portion 31 passes through the opening 35 in the dam 34 and flows into the refrigerant solution discharge portion 33. When the refrigerant solution in the refrigerant solution storage portion 31 is large in quantity, it flows over the dam 34 into the refrigerant solution discharge portion 33. It flows down into the evaporator 4 from the refrigerant solution discharge portion 33 through the refrigerant down-flow pipe 22 and is sprayed onto the heat exchanger 8 by the operation of the refrigerant pump 23P. Thereafter, the refrigerant solution evaporates through heat exchange with cold water running through the heat exchanger 8, and the cold water is cooled by the vaporization heat of the refrigerant solution and supplied to a load such as an air conditioning system of a building. The refrigerant evaporated in the evaporator 4 flows into the absorber 5 and is absorbed into the sprayed absorption solution having a high concentration (to be referred to as "concentrated solution" hereinafter).

The diluted absorption solution whose concentration is reduced by absorbing the refrigerant in the absorber 5 is heated by the low-temperature heat exchanger 12 and the high-temperature heat exchanger 13 and supplied to the high-temperature regenerator 1. The diluted absorption solution is heated by the heater 6 of the high-temperature regenerator 1 again to become an intermediate absorption solution by separating the refrigerant therefrom, and the intermediate absorption solution heat exchanges in the high-temperature heat exchanger 13 to lower its temperature and flows into the low-temperature regenerator 2. The concentrated absorption solution whose concentration is increased by further separating the refrigerant therefrom in the low-temperature regenerator 2 flows into the low-temperature heat exchanger 12 to lower its temperature and returns to the absorber 5.

When the absorption solution and the refrigerant circulate as described above, the controller 28 outputs a signal to the motor M based on the detection temperature of the temperature detector 26. For instance, when the output temperature of cold water which is the detection temperature of the temperature detector 26 rises by an increase in the amount of a load, the controller 28 outputs an opening signal to the motor M. The motor M operates based on the signal from the controller 28 to expand the openings of the control valve 6B and the control valve 61B, thereby increasing the heating amount of the heater 6 and the amount of the refrigerant vapor separated from the diluted absorption solution. As a result, the amounts of the refrigerant solution flowing into the condenser 3 and the refrigerant vapor condensed in the condenser 3 increase, the amount of the refrigerant solution flowing over the dam 34 into the evaporator 4 through the refrigerant solution discharge portion 33 grows, the capacity of the evaporator 4 expands, and the output temperature of cold water lowers.

Further, when the amount of a load decreases, that is, a so-called partial load, and the output temperature of cold water which is the detection temperature of the temperature detector 26 lowers, the controller 28 outputs a closing signal to the motor M to narrow the openings of the control valve 6B and the control valve 61B, thereby reducing the heating amount of the heater 6 and the amount of the refrigerant vapor separated from the diluted absorption solution. As a result, the amount of the refrigerant solution in the refrigerant solution storage portion 31 of the condenser 3 decreases and the amount of the refrigerant solution flowing over the dam 34 reduces. When the amount of the refrigerant solution flowing from the low-temperature regenerator 2 to the condenser 3 and the amount of the refrigerant vapor condensed in the condenser 3 (to be referred to as "amount of the refrigerant solution generated in the condenser" hereinafter) are further reduced by lowering the heating amount of the heater 6, the amount of the refrigerant solution flowing into the refrigerant solution discharge portion 33 through the opening 35 in the dam 34 becomes larger than the amount of the refrigerant solution in the refrigerant solution storage portion 31. As a result, the solution level of the refrigerant solution storage portion 31 lowers gradually and the amount of the refrigerant solution flowing out from the refrigerant solution storage portion 31 through the opening 35 decreases along with a reduction in the solution level. The amount of the refrigerant solution in the refrigerant solution storage portion 31 decreases, the amount of the refrigerant solution circulating together with the absorption solution increases gradually, and the concentration of the absorption solution lowers. The amount of the refrigerant solution flowing from the condenser 3 to the evaporator 4 decreases, the capacity of the evaporator 4 lowers, and the output temperature of cold water rises.

At the time of a partial load as described above, particularly when the amount of the refrigerant solution in the refrigerant solution reservoir 4A of the evaporator 4 is small, the absorption solution circuit is supplemented with the refrigerant solution in the refrigerant solution storage portion 31 and in the refrigerant solution reservoir 4A and the concentration of the absorption solution thereby decreases. Therefore, the operation possible range is expanded.

As described above, the heating amount of the high-temperature regenerator 1 is controlled and the cooling capacity of the evaporator 4 is adjusted to maintain the output temperature of cold water almost to a set temperature, for example, 7° C.

Further, for instance, when the temperature of cooling water drops at the time of a partial load and the refrigerant absorption capacity of the absorption solution in the absorber 5 improves as described above, the refrigerant solution in the refrigerant solution storage portion 31 flows out into the refrigerant solution discharge portion 33 which communicates with the evaporator 4 through the refrigerant down-flow pipe 22 from the opening 35 formed in the dam 34. As a result, the amount of the refrigerant solution in the refrigerant solution storage portion 31 reduces, the amount of the refrigerant solution circulating together with the absorption solution increases, and the concentration of the absorption solution lowers.

According to the above embodiment, even at the time of a reduction in load or when the temperature of cooling water drops along with a reduction in load and the amount of the refrigerant solution generated in the condenser 3 decreases, the refrigerant solution in the refrigerant solution storage portion 31 flows out into the refrigerant solution discharge portion 33 through the opening 35 formed in the dam 34 and moves into the absorption solution circuit through the evaporator 4. Therefore, the concentration of the absorption solution can be reduced with the result that the operation allowable range of the absorption type refrigerator A is expanded.

Since the refrigerant solution discharge portion 33 is formed on a side portion of the condenser 3 in a lower portion of the upper barrel 10 in such a manner that it projects sideways, almost all the lower portion of the condenser 3 of the upper barrel 10 can be used as a storage portion for the refrigerant solution, the amount of the refrigerant solution in the refrigerant solution storage portion 31 can be increased, and the concentration of the absorption solution at the time of a partial load can be further reduced.

Figure 3:
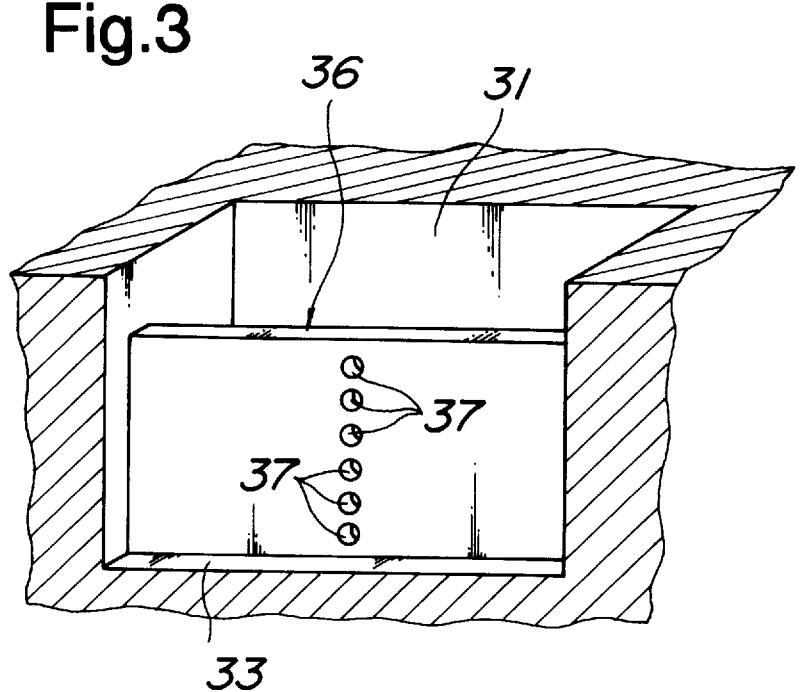
FIG. 3 is a perspective view of a dam according to a second embodiment.

A second embodiment of the present invention is described hereinunder with reference to FIG. 3 which is a perspective view of a dam 36. The dam 36 is provided in the condenser 3 like the dam 34 of the first embodiment and a plurality of circular openings 37 are formed at almost the center of the dam 36 in a vertical direction in such a manner that they are spaced apart from one another. Therefore, during the operation of the absorption type refrigerator A having the condenser 3 with the dam 36, the refrigerant solution gathering in the refrigerant solution storage portion 31 flows into the refrigerant solution discharge portion 33 through the openings 37 in the dam 36.

The openings 37 are provided to ensure that the amount of the refrigerant solution flowing out from the refrigerant solution storage portion 31 into the refrigerant solution discharge portion 33 is larger than the amount of the refrigerant solution gathering in the refrigerant solution storage portion 31 when the amount of the refrigerant solution generated in the condenser 3 is reduced by the operation of the absorption type refrigerator A with a partial load or when the temperature of cooling water drops by a partial load, the amount of the refrigerant solution generated in the condenser 3 decreases, and the refrigerant absorption capacity of the absorber improves. Therefore, the amount of the refrigerant solution in the refrigerant solution storage portion 31 decreases gradually at the time of operation with a partial load, whereby the solution level gradually lowers, the amount of the refrigerant solution flowing together with the absorption solution increases, and the concentration of the absorption solution lowers. Along with a reduction in the solution level of the refrigerant solution storage portion 31, the amount of the refrigerant solution flowing from the openings 37 decreases stepwise.

According to the above second embodiment, like the first embodiment, at the time of a reduction in load or when the temperature of cooling water drops along with a reduction in load, the amount of the refrigerant solution flowing into the refrigerant solution discharge portion 33 from the refrigerant solution storage portion 31 through the openings 37 becomes larger than the amount of the refrigerant solution generated in the condenser 3 along with a reduction in the amount of the refrigerant solution generated in the condenser 3 and the refrigerant solution moves into the absorption solution circuit through the evaporator 4. Therefore, the concentration of the absorption solution can be reduced and thereby the operation possible range of the absorption type refrigerator A can be expanded. Since the plurality of openings 37 are formed in a vertical direction in such a manner that they are spaced apart from one another, the amount of the refrigerant solution flowing out from the refrigerant solution storage portion 31 through the openings 37 decreases almost stepwise along with a reduction in the solution level of the refrigerant solution storage portion 31. Therefore, a sudden change in the circulation amount of the refrigerant solution along with a reduction in load can be prevented.

It is to be understood that the present invention is not limited to the above embodiments but may be embodied in various forms without departing from the spirit and scope thereof.

Figure 4:
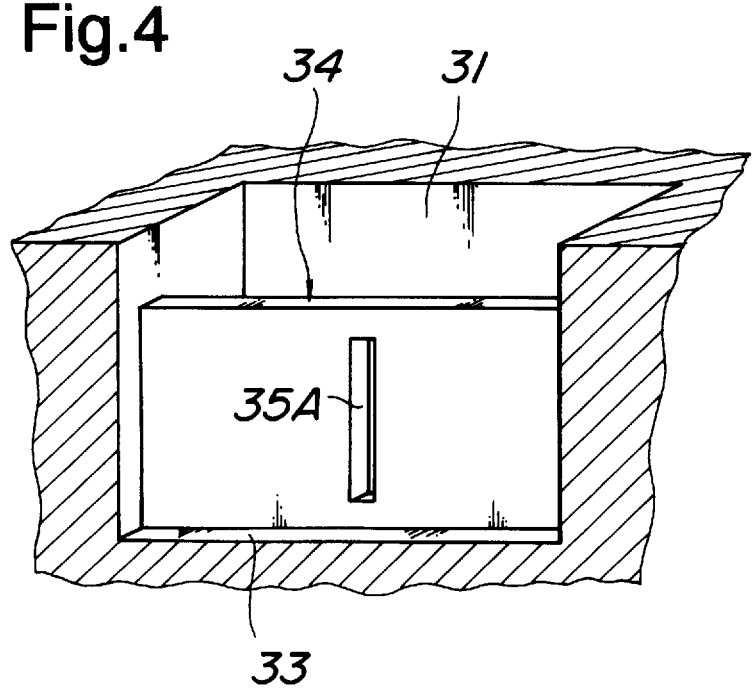
FIG. 4 is a perspective view of a modification of the dam.

For example, while the opening 35 has been formed in a vertical direction from an upper end to a lower end of the dam 34 in the first embodiment, when an opening 35A is formed in the dam 34 in such a manner that it has a space from an upper end and a lower end of the dam 34 as shown in FIG. 4, the same effect as that of the first embodiment can be obtained. The amount of discharge that fits the absorption type refrigerator A having a different capacity can be controlled simply by changing the width of the opening 35 or the opening 35A or the diameter of each of the openings 37.

Further, while only one opening 35 and only one opening 35A have been formed in the dam 34 as shown in FIGS. 2 and 4 and one row of openings 37 have been formed as shown in FIG. 3, a plurality of the openings 35 and a plurality of the openings 35A may be formed or a plurality of rows of the openings 37 may be formed in the dam 36 when each opening is made small. Alternatively, one relatively large opening can be formed only in a lower portion of the dam 36.

In the above embodiments, the refrigerant solution discharge portion 33 is provided by expanding the side surface of the condenser 3 in a lower portion of the upper barrel 10 as shown in FIG. 1. When the dam is formed in a lower portion of the condenser 3 and the lower portion is divided by the dam 34 into the refrigerant solution storage portion 31 located right below the heat exchanger 7 and the refrigerant solution discharge portion 33 which is a portion other than the portion right below the heat exchanger 7, the amount of the refrigerant solution in the refrigerant solution storage portion decreases but almost the same effect as that of the above embodiments can be obtained.

Since the present invention is an absorption type refrigerator as described above, the refrigerant solution gathering in the refrigerant solution storage portion is caused to flow out from the condenser through the opening provided in the dam at the time of a partial load or when the temperature of cooling water drops at the time of a partial load, whereby the concentration of the absorption solution can be reduced and thereby the operation allowable range of the refrigerator is expanded. Particularly when a plurality of openings are formed discontinuously in a vertical direction, the amount of the refrigerant solution flowing out from the refrigerant solution storage portion through the openings decreases stepwise along with a reduction in the solution level of the refrigerant solution storage portion. Therefore, a sudden change in the circulation amount of the refrigerant solution reduction in load can be prevented.

What is claimed is:

1. An absorption type refrigerator comprising a refrigeration cycle by connecting an absorber, regenerator, condenser and evaporator by pipes, wherein a heat exchanger for condensing refrigerant vapor in the condenser is provided in the condenser, a refrigerant solution storage portion and a refrigerant solution discharge portion partitioned by a dam are provided below the heat exchanger, and at least one opening communicating with the refrigerant solution storage portion and the refrigerant solution storage portion and the refrigerant solution discharge portion is formed in the dam wherein said at least one opening in the dam is formed to a size that a refrigerant solution larger in quantity than a refrigerant flowing into the condenser from the regenerator flows out from the refrigerant solution storage portion to the refrigerant solution discharge portion at the time of operation of a partial load which limits the quantity of heat to be supplied to the regenerator.

2. The absorption type refrigerator of claim 1, wherein the opening in the dam is a slit extending in a vertical direction.

3. The absorption type refrigerator of claim 1 wherein said opening comprises a first opening and further comprises at least one additional opening formed discontinuously in the dam in a vertical direction.

* * * * *